Minor & Ward.
Carriage-Hub.

Nº 75948. Patented Mar. 24, 1868.

Witnesses.
Thos Tusche
A. A. Fraser

Inventor.
Jno W Minor
D P Ward
Per Munn & Co
Attorneys

United States Patent Office.

JOHN W. MINOR AND DAVID P. WARD, OF NEW BEDFORD, MASSACHUSETTS.

Letters Patent No. 75,948, dated March 24, 1868.

---

IMPROVEMENT IN CARRIAGE-HUB.

---

*The Schedule referred to in these Letters Patent and making part of the same.*

---

TO ALL WHOM IT MAY CONCERN:

Be it known that we, JOHN W. MINOR and DAVID P. WARD, of New Bedford, in the county of Bristol, and State of Massachusetts, have invented a new and improved Carriage-Hub; and we do hereby declare that the following is a full, clear, and exact description thereof, which will enable those skilled in the art to make and use the same, reference being had to the accompanying drawings, forming part of this specification.

This invention relates to a new and improved method of constructing hubs for the wheels of carriages, whereby the spokes are more easily and more firmly secured to the same, and whereby the spokes are less liable to be injured by the jar, and whereby, also, one or more spokes may at any time be removed and replaced without cutting the tire.

It consists also of circular disks of rubber, or other substance having like qualities, between the flanges and the spokes, whereby injury to the spokes is prevented by the jar of the carriage. In the accompanying plate of drawings—

Similar letters of reference indicate corresponding parts.

A is the spindle or box. $a^2$ is the fixed flange or collar on the same. A' is the movable collar or flange. $e$ are the elastic disks. D is the bore through the spindle to receive the axle. B is a screw-thread on the end of spindle A. $n$ is a nut fitting on screw-thread B of spindle A. $a$ are the spokes.

Figure 2:
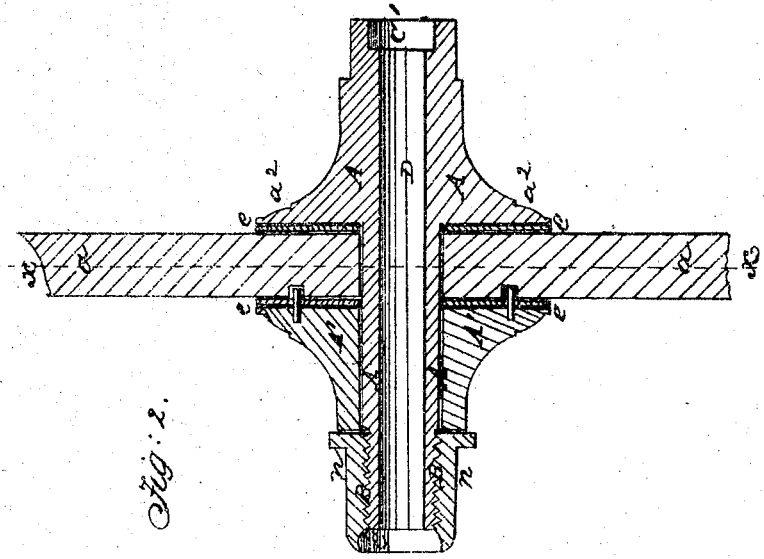
Figure 2 represents a central vertical longitudinal section of the same.
Figure 1:
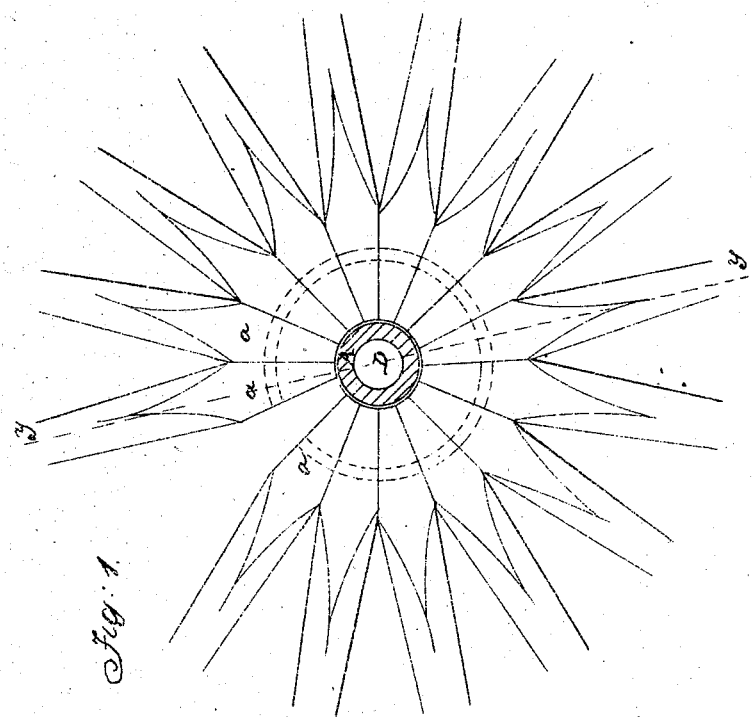
Figure 1 represents a cross-section of our invention, taken in the line $x\, x$, fig. 2, the movable flange and one of the elastic disks being removed, to show the manner of shaping and arranging the spokes, one of the spokes also shown as removed.

The spindle A is made of cast iron or of other suitable material, and is of sufficient length to form the box, and of proper size for the carriage or vehicle upon which it is to be used. Said spindle is bored or reamed out so as to receive any required axle, so as to form the bore D, as shown in the drawing, fig. 2. Upon said spindle A, and a little one side of the middle thereof, is cast the flange or collar $a^2$, either a part of said spindle, or rigidly attached thereto, as shown. Said flange $a^2$ has one plane face towards the longer end of the spindle A, as shown, the other face being finished into any desired form. The spindle A, on the same end of the same as the flange $a^2$, is finished off into any convenient number of sides, so as to receive a wrench whereby to hold the hub in position, when it becomes necessary to loosen or tighten the nut $n$. Said spindle A, on the same end as the flange $a^2$, is chambered out on the inside so as to form the chamber C', to form a housing in the ordinary way for the collar on the end of axle-tree.

The movable collar or flange A' is made of the same material, and is of the same general form as the flange $a$, having the side towards the flange $a^2$ faced. Said collar or flange A' is bored out through the centre, so as to receive and slide on the spindle A, as shown in the drawing, and so as that the same may be at any time removed. Said spindle A is provided on the end of the same, opposite to the chamber C', as shown, with a screw-thread, S. Upon the screw-thread S is fitted a metallic nut, $n$, provided on one end with a shoulder, to bear against the outer end of the flange A' in such a manner that by turning the nut $n$ in one direction, the flange A' will be forced towards the face of the flange $a^2$. Said nut $n$ is chambered out on the inside of the other end, so as to form a chamber, C, for a housing for the nut, which secures the hub to the axle-tree, or if it is desirable to have a close cap or housing, then the cap or housing may be made separate from the nut, the nut bearing against the collar as above described, occupying about two-thirds of the length of the screw-thread B, and a close cap, provided with a screw-thread on the inside, occupying the other or outer third of the length of said screw-thread B. The nut $n$ is provided with a lip or flange, cut into any convenient number of sides on the outside of the same, to receive a wrench, by means of which the nut $n$ may be screwed up or loosened when required. Upon the spindle A, and so as to rest against the faces of the flanges A' $a^2$, are the circular disks $e$. Said circular disks $e$ are made of rubber or other substance having like qualities, and are of any convenient thickness, and of a diameter equal to the diameter of the faces of the flanges A' $a^2$, as shown in the drawing. Said disks $e$ are provided with a hole in the centre to receive the spindle A.

The spokes $a$ are made of the ordinary materials and shape, except where they enter between the flanges A′ and a². They are not provided with a tenon, but are tapered so as to fit against each other, and project beyond the hub in the ordinary way, so as to occupy all the space between the flanges A′ and a².

The operation is such that by removing the nut n and the flange A′, and placing one of the disks e against the face of the flange a², and placing the spokes a, so formed as above described, against the said disk, and placing the other of said disks e against the spokes a on the opposite side of the same, and putting the flange A′, with its face side to said disk, and turning on the nut n, the flange A′ is forced against said disk, and said disks e and spokes a are forced against the face of the flange a², whereby said spokes a are firmly held in position between the said flanges A′ and a², as shown. A ring or key may be cast upon or secured to the faces of the flanges A′ and a², or either of them, which engages with a mortise in the spokes a, to hold said spokes a more firmly in position, if required.

Constructed as above described, it constitutes a cheap, neat, and convenient hub and axle-box combined, the advantages of which are that the elastic disks e are made to conform to any unequal surfaces on the spokes a, and any injury to said spokes from the jarring of the carriage is prevented, and that no additional box is required, and that a spoke or spokes may at any time be taken out and renewed without cutting the tire.

We claim as new, and desire to secure by Letters Patent—

The collar A′, provided with a series of pins upon its face, entering through the elastic disk e, and with the tenons formed in the spokes, when said collar is adapted to slide upon the spindle A, as herein described, for the purpose specified.

The above specification of our invention signed by us, this 1st day of November, 1857.

JOHN W. MINOR,
DAVID P. WARD.

Witnesses:
 ALLEN RAYMOND,
 L. S. CUSHMAN.